(12) United States Patent
Moritomo

(10) Patent No.: US 10,785,816 B2
(45) Date of Patent: Sep. 22, 2020

(54) COMMUNICATION APPARATUS FOR CONNECTING TO A WIRELESS NETWORK, METHOD FOR CONTROLLING SUCH A COMMUNICATION APPARATUS, AND STORAGE MEDIUM STORING INSTRUCTIONS FOR CONNECTING TO A WIRELESS NETWORK

(71) Applicant: CANON KABUSHIKI KAISHA, Tokyo (JP)

(72) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 15/569,274

(22) PCT Filed: Mar. 30, 2016

(86) PCT No.: PCT/JP2016/001838
§ 371 (c)(1),
(2) Date: Oct. 25, 2017

(87) PCT Pub. No.: WO2016/174821
PCT Pub. Date: Nov. 3, 2016

(65) Prior Publication Data
US 2018/0124860 A1    May 3, 2018

(30) Foreign Application Priority Data

Apr. 30, 2015   (JP) ................ 2015-093543

(51) Int. Cl.
*H04W 76/14*   (2018.01)
*H04W 8/00*    (2009.01)
(Continued)

(52) U.S. Cl.
CPC ....... *H04W 76/14* (2018.02); *H04M 1/72563* (2013.01); *H04W 8/005* (2013.01);
(Continued)

(58) Field of Classification Search
CPC ..... H04W 76/14; H04W 8/005; H04W 12/08; H04W 48/16; H04M 1/72563
See application file for complete search history.

(56) References Cited

U.S. PATENT DOCUMENTS 8,887,262 B1* 11/2014 Turner ................ H04L 63/0853
726/10
2003/0063313 A1* 4/2003 Ito ......................... G06F 3/1253
358/1.15
(Continued)

FOREIGN PATENT DOCUMENTS

JP      2006-261938 A     9/2006
JP      2014-060623 A     4/2014
(Continued)

*Primary Examiner* — Jael M Ulysse
(74) *Attorney, Agent, or Firm* — Canon U.S.A., Inc. I.P. Division

(57) ABSTRACT

A display unit displays an image including information which is necessary to share communication parameters for establishing a wireless connection and information about a scheme for establishing a wireless connection, whereby the connection scheme to be performed is shared with a target apparatus, and a wireless connection is established by using the desired connection scheme.

30 Claims, 7 Drawing Sheets

(51) Int. Cl.
*H04W 48/16* (2009.01)
*H04M 1/725* (2006.01)
*H04W 12/08* (2009.01)
*H04W 84/12* (2009.01)
*H04W 92/18* (2009.01)

(52) U.S. Cl.
CPC ........... *H04W 12/08* (2013.01); *H04W 48/16* (2013.01); *H04W 84/12* (2013.01); *H04W 92/18* (2013.01)

(56) References Cited

U.S. PATENT DOCUMENTS

| | | | | |
|---|---|---|---|---|
| 2004/0215815 A1* | 10/2004 | Rekimoto | ............... | H04L 67/14 709/236 |
| 2006/0200854 A1* | 9/2006 | Saito | ............... | G06F 21/33 726/2 |
| 2007/0239877 A1* | 10/2007 | Uchida | ............... | H04M 1/7253 709/228 |
| 2008/0039063 A1* | 2/2008 | Ichieda | ............... | H04L 67/36 455/420 |
| 2009/0066998 A1* | 3/2009 | Kato | ............... | G01C 21/26 358/1.15 |
| 2009/0247158 A1* | 10/2009 | Hara | ............... | H04W 48/20 455/434 |
| 2009/0262663 A1* | 10/2009 | Gosset | ............... | H04L 41/12 370/254 |
| 2011/0122835 A1* | 5/2011 | Naito | ............... | H04W 76/14 370/329 |
| 2012/0165056 A1* | 6/2012 | Kim | ............... | H04W 16/14 455/509 |
| 2013/0034023 A1* | 2/2013 | Jung | ............... | H04L 67/104 370/255 |
| 2013/0182695 A1* | 7/2013 | Hahm | ............... | H04W 84/12 370/338 |
| 2013/0215829 A1* | 8/2013 | Suzuki | ............... | H04L 12/413 370/328 |
| 2013/0231051 A1* | 9/2013 | Naruse | ............... | G06F 3/1204 455/41.2 |
| 2013/0260679 A1* | 10/2013 | Su | ............... | H04B 5/00 455/41.1 |
| 2013/0260683 A1* | 10/2013 | Suzuki | ............... | G06F 3/1204 455/41.1 |
| 2013/0272224 A1* | 10/2013 | Ogawara | ............... | H04W 48/10 370/329 |
| 2014/0044010 A1* | 2/2014 | Hiroshige | ............... | H04W 24/02 370/254 |
| 2014/0146727 A1* | 5/2014 | Segev | ............... | H04W 48/08 370/311 |
| 2014/0220939 A1* | 8/2014 | Takae | ............... | H04W 12/08 455/411 |
| 2014/0254523 A1* | 9/2014 | Chai | ............... | H04W 72/04 370/329 |
| 2014/0269646 A1* | 9/2014 | Ramasamy | ............... | H04W 76/14 370/338 |
| 2014/0287751 A1* | 9/2014 | Lee | ............... | H04W 48/16 455/434 |
| 2014/0293829 A1* | 10/2014 | Visuri | ............... | H04L 12/145 370/254 |
| 2014/0334340 A1 | 11/2014 | Goto | | |
| 2015/0023649 A1* | 1/2015 | Wang | ............... | H04N 21/43637 386/231 |
| 2015/0079939 A1* | 3/2015 | Naka | ............... | H04W 12/04 455/411 |
| 2015/0099512 A1 | 4/2015 | Amano | | |
| 2015/0189461 A1* | 7/2015 | Pang | ............... | H04W 76/14 455/41.1 |
| 2015/0365985 A1* | 12/2015 | Terashita | ............... | H04W 76/10 370/329 |
| 2016/0004497 A1* | 1/2016 | Nishi | ............... | H04W 76/15 358/1.15 |

FOREIGN PATENT DOCUMENTS

JP 2014-230152 A 12/2014
WO 2014190950 A 12/2014

* cited by examiner

[Fig. 1]
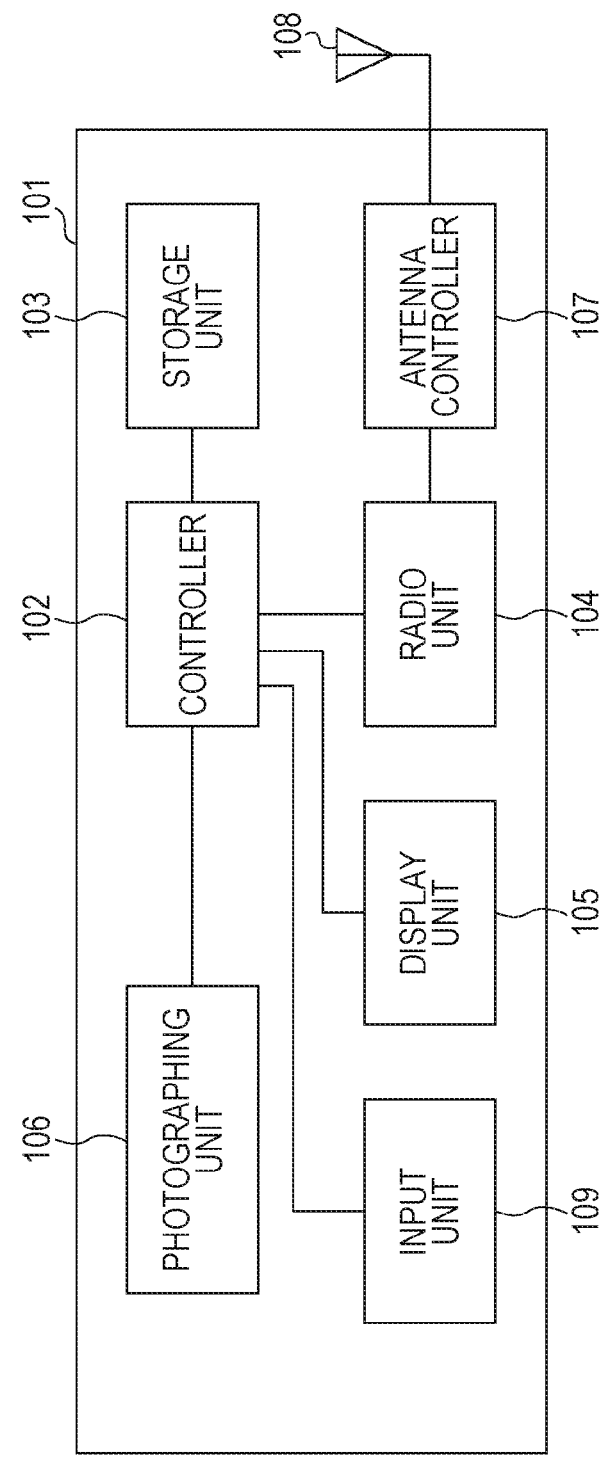

[Fig. 2]
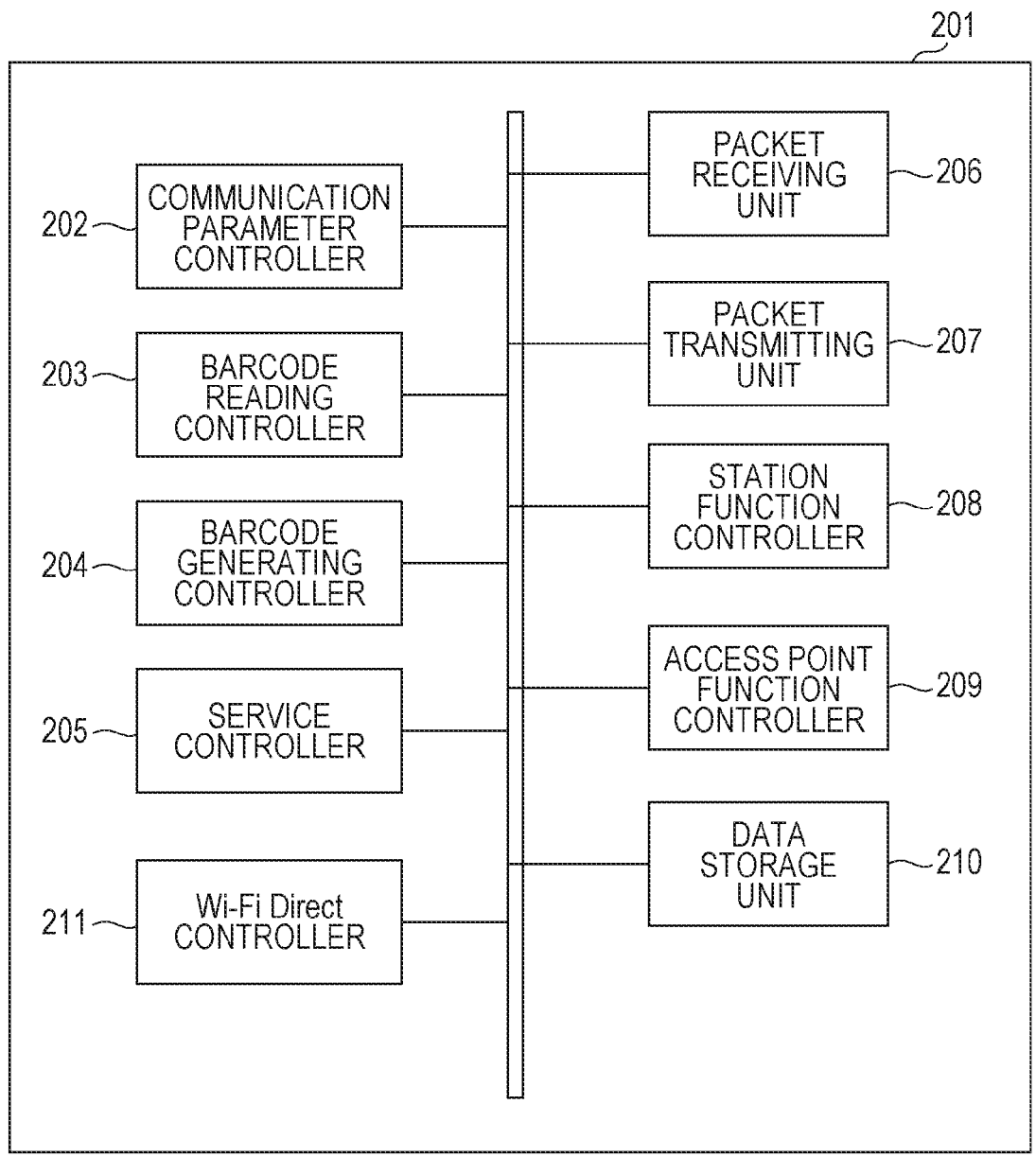

[Fig. 3]
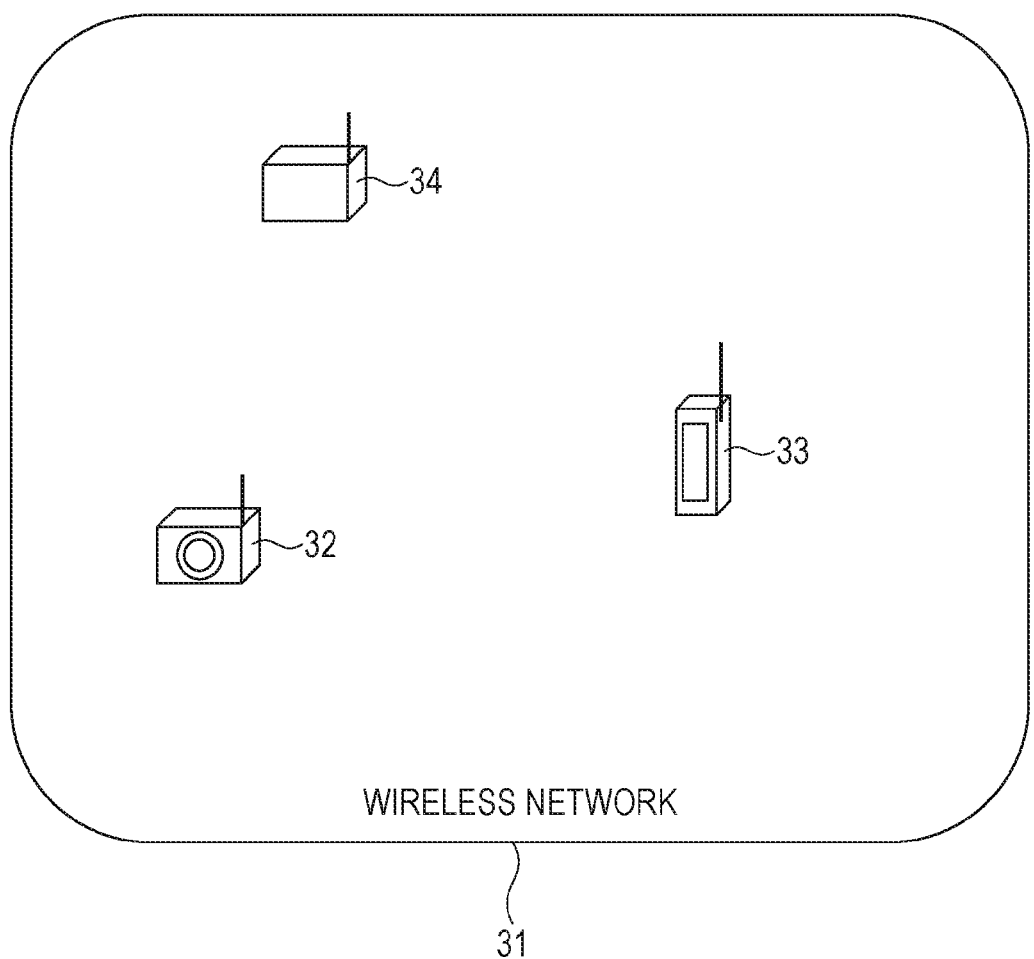

[Fig. 4]
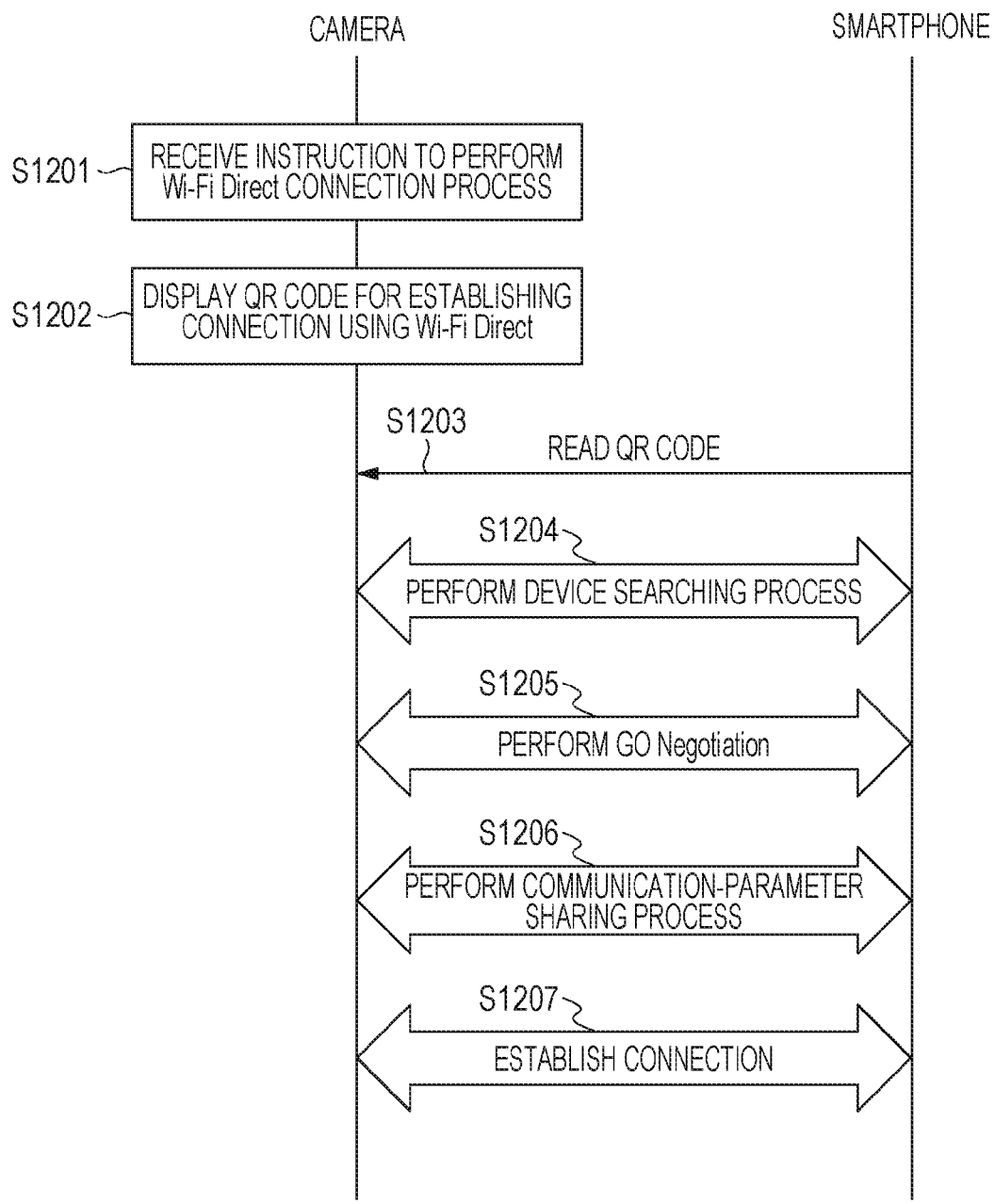

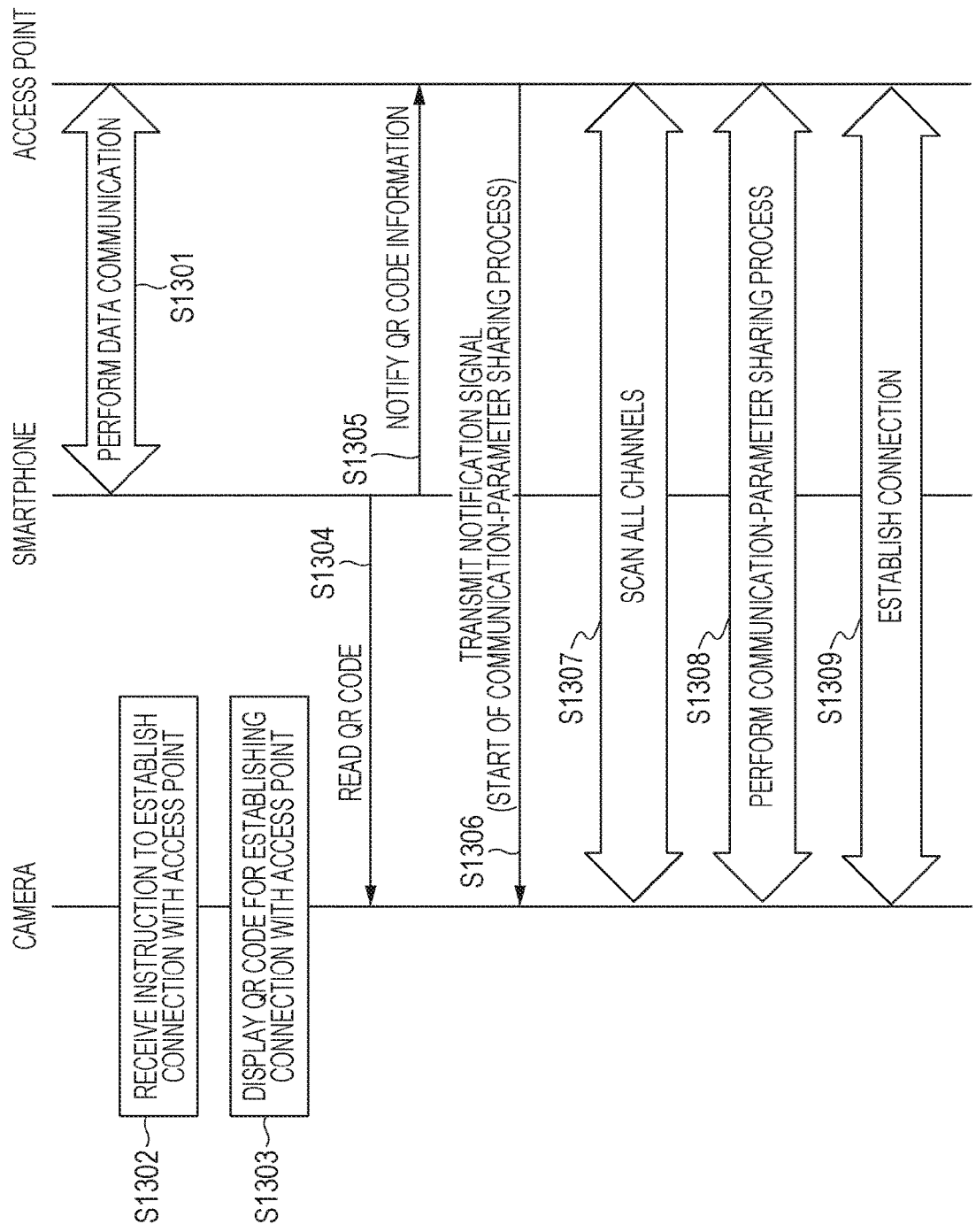
[Fig. 5]

[Fig. 6]
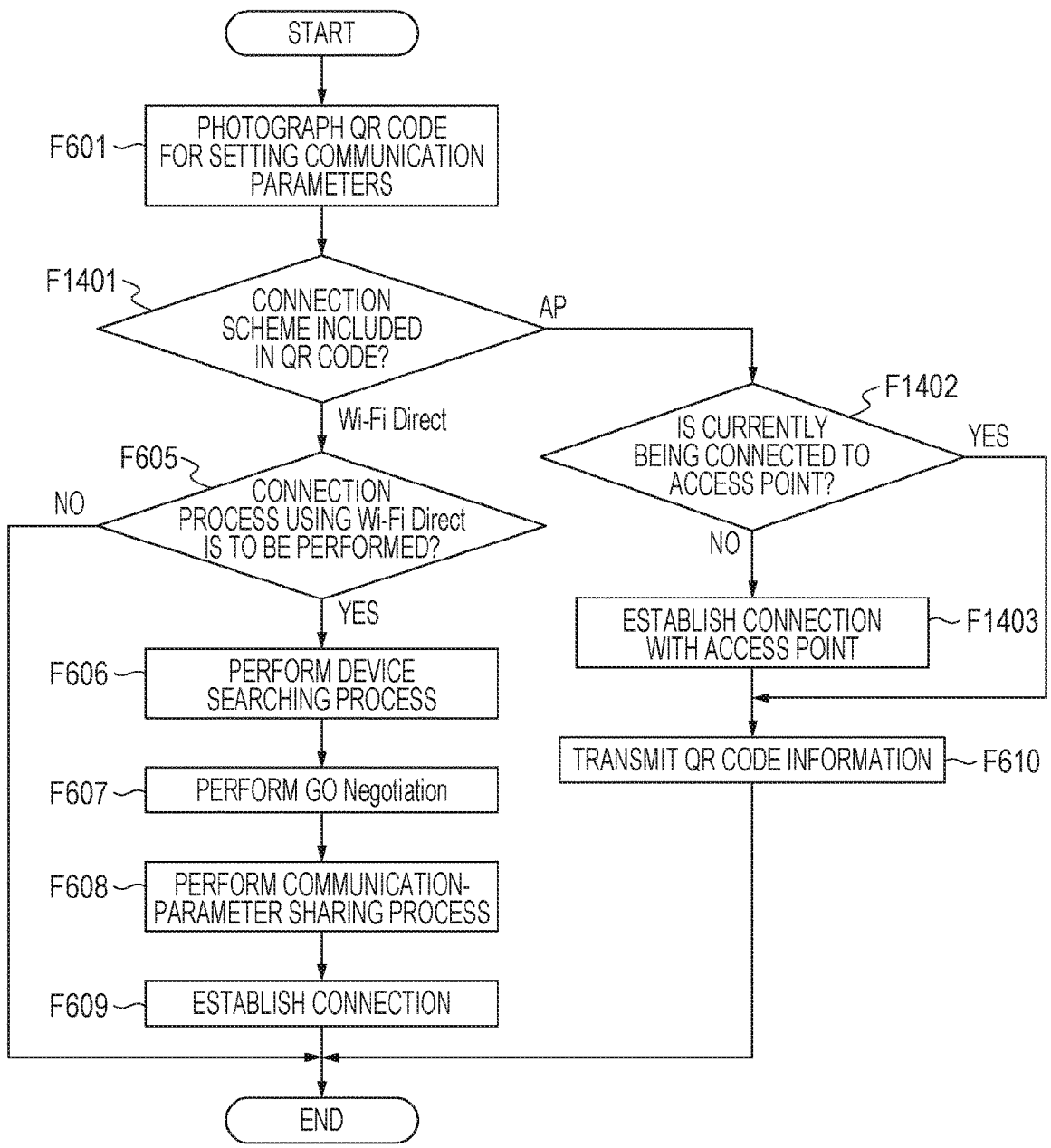

[Fig. 7]
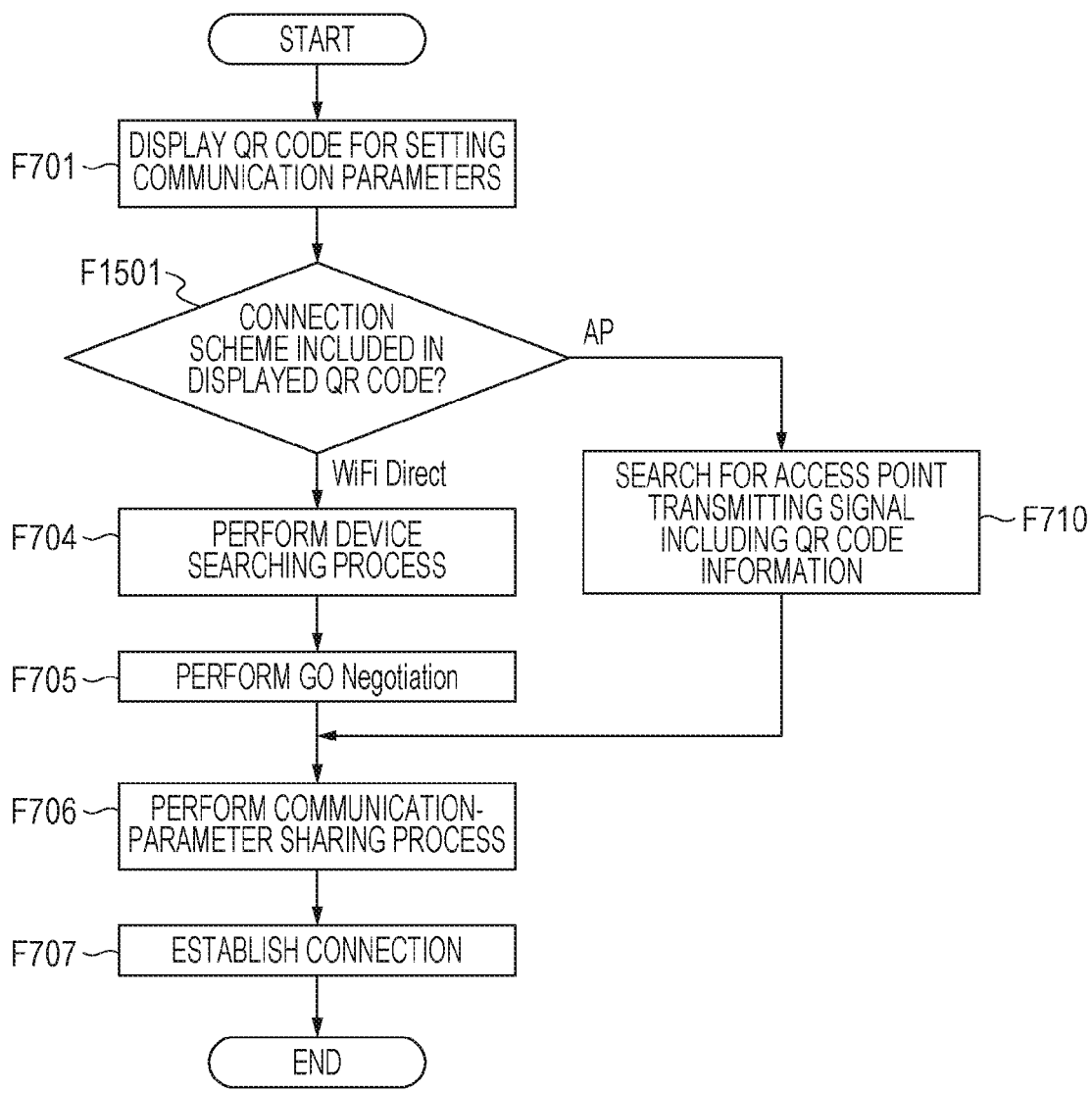

COMMUNICATION APPARATUS FOR CONNECTING TO A WIRELESS NETWORK, METHOD FOR CONTROLLING SUCH A COMMUNICATION APPARATUS, AND STORAGE MEDIUM STORING INSTRUCTIONS FOR CONNECTING TO A WIRELESS NETWORK

TECHNICAL FIELD

The present invention relates to communication technology.

BACKGROUND ART

Recently, it has been increasingly observed that electronic devices, such as a digital camera, a printer, a cellular phone, and a smartphone, are provided with a wireless communication function and that such devices connected to a wireless network are used.

To connect electronic devices to a wireless network, it is necessary to set various communication parameters, such as an encryption scheme, an encryption key, an authentication scheme, and an authentication key. As a technique for facilitating setting of these communication parameters, techniques disclosed in PTL 1 and PTL 2 are known. In PTL 1, a technique is proposed in which an electronic device displays a quick response (QR) code (trademark, which will not be described hereinafter) indicating communication parameters. A portable terminal photographs and reads the QR code, and sets the read communication parameters to an access point. In PTL 2, communication parameters generated by an access point are encoded into a two-dimensional code, and the access point displays the two-dimensional code on a screen. A portable terminal takes an image of the two-dimensional code displayed on the access point, and decodes the two-dimensional code, thereby setting the communication parameters to the portable terminal.

Connection processes called Wi-Fi Direct (registered trademark, which will not be described hereinafter) defined by the Wi-Fi Alliance to connect electronic devices directly to each other are defined as standards. In Wi-Fi Direct, an operation of searching for another apparatus efficiently by using 1ch, 6ch, and 11ch is defined.

As in PTL 1 and PTL 2, code information, such as a two-dimensional code, in which many pieces of information may be encoded is photographed so as to set communication parameters, whereby an electronic device may be connected to an access point while user input complexity is reduced.

In the specification of Wi-Fi Direct, a communication-parameter sharing process called Wi-Fi Protected Setup (WPS) defined by the Wi-Fi Alliance is performed to set communication parameters. However, consideration is not given to a case in which, when apparatuses are to share communication parameters with each other according to a technique such as Wi-Fi Direct for connecting apparatuses to each other, a scheme for performing a communication-parameter sharing process by photographing an image as in PTL 1 and PTL 2 is applied.

In a technique such as Wi-Fi Direct for connecting apparatuses to each other, when a communication-parameter sharing process using information about a photographed image is performed between two apparatuses as in PTL 2, a target apparatus which is to share communication parameters is searched for by using 1ch, 6ch, and 11ch as described above. In contrast, as in PTL 1, when an apparatus displaying an image (hereinafter referred to as an image displaying apparatus) is to be connected to an access point by using image information, the image displaying apparatus needs to search for the access point in all channels.

Thus, in known techniques, no consideration is given to a case in which multiple setting methods may be performed after photographing of code information, as in the method, disclosed in PTL 2, for setting communication parameters between two apparatuses, and as in the method, disclosed in PTL 1, for setting communication parameters using three apparatuses. For example, when an image displaying apparatus displays an image in order to establish a connection between two apparatuses by using Wi-Fi Direct, the image displaying apparatus searches for the target apparatus by using 1ch, 6ch, and 11ch. In this case, if an apparatus photographing an image (hereinafter referred to as an image photographing apparatus) tries to connect the image displaying apparatus to an access point as in PTL 1, the image photographing apparatus does not start the Wi-Fi Direct process. Therefore, the image displaying apparatus may fail to detect the image photographing apparatus as a connection target in Wi-Fi Direct, resulting in failure to establish a connection using Wi-Fi Direct.

For example, when an image displaying apparatus displays an image in order to establish a connection with an access point, the image displaying apparatus searches for the access point, i.e., a target apparatus, by using all channels. In this case, if an image photographing apparatus tries to establish a connection with the image displaying apparatus by using Wi-Fi Direct, the image photographing apparatus does not notify the access point of information about the image displaying apparatus. Therefore, the access point does not start a process for sharing communication parameters. Even when the image displaying apparatus detects the access point, an operation in which the image displaying apparatus and the access point share communication parameters with each other is possibly not started.

Thus, for example, if the image displaying apparatus and the image photographing apparatus do not share a connection scheme with each other, a wireless connection is possibly not established by using the desired connection scheme.

CITATION LIST

Patent Literature

PTL 1: Japanese Patent Laid-Open No. 2014-60623
PTL 2: Japanese Patent Laid-Open No. 2006-261938
PTL 3: Japanese Patent Laid-Open No. 2014-230152

SUMMARY OF INVENTION

Solution to Problem

The present invention provides a communication apparatus including a display controller and a sharing unit. The display controller causes a display unit to display an image including first information and second information. The first information is necessary to share at least one communication parameter for establishing a wireless connection. The second information concerns a scheme for establishing a wireless connection. The second information indicates at least one of a first scheme and a second scheme. The first scheme is a scheme for establishing a wireless connection with an access point. The second scheme involves negotiation for determining whether the at least one communication parameter is to be provided or is to be received. The sharing unit shares the at least one communication parameter with the access point or a different communication apparatus on the basis of the first information which is included in the image displayed by the display controller and which is necessary to share the at least one communication parameter.

According to another aspect, the present invention provides a communication apparatus including an acquiring unit, a notifying unit, a search unit, a sharing unit, and an establishing unit. The acquiring unit acquires information from a photographed image. The notifying unit notifies an access point of predetermined information when the information acquired by the acquiring unit includes information indicating a first scheme for establishing a wireless connection with the access point. The search unit searches for a different communication apparatus which is performing a process according to a second scheme, when the information acquired by the acquiring unit includes information indicating the second scheme. The second scheme involves negotiation for determining whether a communication parameter is to be provided or is to be received. The sharing unit shares the communication parameter with the different communication apparatus when the search unit detects the different communication apparatus. The establishing unit establishes a wireless connection with the different communication apparatus on the basis of the communication parameter shared by the sharing unit.

Further features of the present invention will become apparent from the following description of exemplary embodiments with reference to the attached drawings.

BRIEF DESCRIPTION OF DRAWINGS

FIG. 1 is a diagram illustrating the configuration of a communication apparatus.

FIG. 2 is a diagram illustrating the software functional configuration of the communication apparatus.

FIG. 3 is a diagram illustrating an exemplary configuration of a communication system.

FIG. 4 is a diagram illustrating an exemplary sequence in the communication system.

FIG. 5 is a diagram illustrating an exemplary sequence in the communication system.

FIG. 6 is a flowchart of operations performed by a smartphone.

FIG. 7 is a flowchart of operations performed by a camera.

DESCRIPTION OF EMBODIMENTS

In embodiments described below, a description will be made on a process for, in the case where photographing of an image triggers sharing of communication parameters, sharing information about a process that is to be performed on the image-displaying side and on the image-photographing side, and establishing a wireless connection by using a desired connection scheme.

A communication apparatus according to an embodiment will be described below in detail with reference to the drawings. A description will be made below on an example using a wireless local-area network (LAN) system based on The Institute of Electrical and Electronics Engineers, Inc. (IEEE) 802.11 series. However, the communication configuration is not necessarily limited to a wireless LAN based on IEEE 802.11.

FIG. 3 illustrates a communication system according to the present embodiment. The communication system illustrated in FIG. 3 includes a camera 32, a smartphone 33, and an access point 34 (hereinafter referred to as an AP). A wireless network 31 is a wireless LAN network formed by the AP 34.

A description will be made by using a camera and a smartphone as apparatuses in the communication system according to the present embodiment. However, the apparatuses may be other apparatuses, such as a printer, a personal computer (PC), a video camera, a smartwatch, and a personal digital assistant (PDA).

In the present embodiment, the AP 34 acts as an access point operating in the infrastructure mode defined in the IEEE 802.11 standard. In the case where other apparatuses are connected to the AP 34, the apparatuses act as stations (STAs) operating in the infrastructure mode defined in the IEEE 802.11 standard.

In addition, the camera 32 and the smartphone 33 may be connected to each other in a wireless LAN network formed by the camera 32 or the smartphone 33 based on Wi-Fi Direct.

A description about Wi-Fi Direct will be made. Wi-Fi Direct is a communication standard defined by the Wi-Fi Alliance. In Wi-Fi Direct, a process of searching for a communication target is defined. In Wi-Fi Direct, a connection sequence for wireless LAN communication is defined.

In Wi-Fi Direct, a communication apparatus acting as a wireless LAN access point is referred to as a peer-to-peer (P2P) group owner (hereinafter referred to as a GO), and a communication apparatus acting as a wireless LAN station is referred to as a P2P client (hereinafter referred to as a CL). That is, in Wi-Fi Direct, a GO acts as a base station, and a CL acts as a slave station. These roles are determined in a role determining process which is called GO negotiation defined in Wi-Fi Direct. An apparatus plays either of the roles, and wireless communication is performed among apparatuses. That is, in Wi-Fi Direct, multiple roles are defined, and a process of determining a role, which is used when communication is performed, for each apparatus from these roles is involved.

In Wi-Fi Direct, a network formed by a GO is referred to as a P2P group. Herein, a network may be denoted as a P2P group. Either term is used as having the same meaning.

Herein, a GO, CLs, and communication apparatuses for which roles have not been determined are collectively referred to as P2P devices.

When Wi-Fi Direct is used to establish a connection among apparatuses, the GO provides communication parameters to a CL, and the communication parameters are used to establish a connection. The communication parameters include various wireless communication parameters for performing wireless communication based on the IEEE 802.11 standard. That is, the communication parameters include wireless communication parameters which are necessary to perform wireless LAN communication, such as a service set identifier (SSID) as a network identifier, an encryption scheme, an encryption key, an authentication scheme, and an authentication key. The communication parameters may include a media access control (MAC) address and an Internet Protocol (IP) address for performing communication in the IP layer.

The hardware configuration of each apparatus in the communication system illustrated in FIG. 3 will be described by using FIG. 1, according to the present embodiment. FIG. 1 illustrates the entire apparatus 101. A controller 102 controls the entire apparatus by executing control programs stored in a storage unit 103. The controller 102 is constituted, for example, by a central processing unit (CPU). The storage unit 103 stores the control programs executed by the controller 102, image data, and various types of information such as communication parameters. Various operations described below are performed by the controller 102 executing the control programs stored in the storage unit 103. The storage unit 103 is constituted, for example, by a storage medium, such as a hard disk drive (HDD), a flash memory, or a removable secure digital (SD) card.

A radio unit 104 performs wireless LAN communication based on the IEEE 802.11 series. The radio unit 104 is made up by a chip performing wireless communication. A display unit 105 performs various types of display operations, and has a function which allows output of visually recognizable information, for example, using a liquid crystal display (LCD) or a light-emitting diode (LED), or output of sound, for example, from a speaker. The display unit 105 has a function of outputting at least one of visual information and sound information. When the display unit 105 displays visual information, the display unit 105 includes a video RAM (VRAM) storing image data corresponding to visual information to be displayed. The display unit 105 performs display control for continuously displaying image data stored in the VRAM on the LCD or the LED.

A photographing unit 106 which is constituted by an image sensor, a lens, and the like takes a photograph and a movie. For example, the photographing unit 106 reads code information, such as a barcode, a two-dimensional code, or a quick response (QR) code.

An antenna controller 107 performs output control on an antenna 108. The antenna 108 is an antenna which is capable of performing communication in the 2.4 GHz band and/or the 5 GHz band in a wireless LAN. An input unit 109 is used by a user performing various types of input so as to operate the communication apparatus 101. The input unit 109 stores a flag corresponding to an input, in a memory such as the storage unit 103.

FIG. 2 is a block diagram illustrating an exemplary configuration of the software functional blocks performing communication control functions described below. In the present embodiment, the functional blocks in each apparatus are stored as programs in the storage unit 103. The controller 102 performs the programs, whereby the functions of the blocks are performed. According to the control programs, the controller 102 performs control on each piece of hardware, and performs calculation and processing on information, whereby the functions are implemented. Some or all of the functional blocks may be implemented as hardware. In this case, a part or all of each functional block is constituted, for example, by an application specific integrated circuit (ASIC).

FIG. 2 illustrates the entire software functional block 201. A communication parameter controller 202 is illustrated. The communication parameter controller 202 performs a communication-parameter sharing process for sharing communication parameters between apparatuses. In the communication-parameter sharing process, a parameter-providing apparatus provides communication parameters for establishing a wireless communication, to a parameter-receiving apparatus. The communication parameters include wireless communication parameters which are necessary to perform wireless LAN communication, such as an SSID as a network identifier, an encryption scheme, an encryption key, an authentication scheme, and an authentication key. The communication parameters may include a MAC address, a passphrase, an IP address for performing communication in the IP layer, and information which is necessary for an upper service. The communication-parameter sharing process performed by the communication parameter controller 202 may be Wi-Fi Protected Setup (WPS) defined by the Wi-Fi Alliance. The communication-parameter sharing process performed by the communication parameter controller 202 may employ a method in which a public-key encryption scheme is used to transfer the communication parameters safely.

A barcode reading controller 203 is illustrated. The barcode reading controller 203 analyzes an image photographed by the photographing unit 106, and obtains code information obtained through coding. The barcode reading controller 203 analyzes code information, such as a barcode, a two-dimensional code, or a QR code.

A barcode generating controller 204 is illustrated. The barcode generating controller 204 generates code information, such as a barcode, a two-dimensional code, or a QR code, and performs control so as to display the generated code information on the display unit 105. The barcode generating controller 204 causes a QR code in which information necessary to set communication parameters is coded, to be displayed.

A service controller 205 performs control in the application layer. The application layer refers to a service providing layer in an upper layer which is a fifth or higher layer in the Open Systems Interconnection (OSI) reference model. That is, the service controller 205 uses wireless communication using the radio unit 104 to perform a print process, an image streaming process, a file transfer process, and the like.

A packet receiving unit 206 and a packet transmitting unit 207 control reception/transmission of all packets including communication protocols for the upper layers. The packet receiving unit 206 and the packet transmitting unit 207 control the radio unit 104 to receive and transmit packets from and to a target apparatus based on the IEEE 802.11 standard.

A station function controller 208 provides an STA function for acting as an STA in the infrastructure mode defined in the IEEE 802.11 standard. When the apparatus acts as an STA, the STA function controller 208 performs an authentication process, an encryption process, and the like. An access point function controller 209 provides an AP function for acting as an AP in the infrastructure mode defined in the IEEE 802.11 standard. The AP function controller 209 forms a wireless network, and performs an authentication process and an encryption process for an STA, management of an STA, and the like. A data storage unit 210 performs control to read/write software itself, communication parameters, code information, and the like from/in the storage unit 103.

A Wi-Fi Direct controller 211 performs various processes based on Wi-Fi Direct described above. When the apparatus acts as a GO, the Wi-Fi Direct controller 211 functions as an AP by using the AP function controller 209. When the apparatus acts as an STA, the Wi-Fi Direct controller 211 functions as an STA by using the STA function controller 208.

Operations performed in the communication system having the above-described configuration will be described. A description will be made below on a case in which the smartphone 33 photographs a QR code displayed by the camera 32, and in which information about the photographed. QR code is used to establish a wireless connection between apparatuses. FIG. 4 illustrates a connection sequence based on Wi-Fi Direct using a QR code between communication apparatuses, i.e., the camera 32 and the smartphone 33. In the present embodiment, a description will be made on a case in which an apparatus which display a QR code notifies an apparatus photographing the QR code, of a connection scheme. A connection scheme is selected on the camera 32 which is to display a QR code, and a QR code according to the selected connection scheme is displayed. A description will be made on a case in which the camera 32 which is to display a QR code requests a connection using Wi-Fi Direct, by using the sequence chart in FIG. 4.

In FIG. 4, when the camera 32 enters the communication parameter setting mode, the camera 32 causes the display unit 105 to display an inquiry about whether a Wi-Fi Direct process is to be performed or an access point connection is to be established, to a user. Assume that the camera 32 receives an instruction to perform a Wi-Fi Direct process through the input unit 109 (S1201).

The camera 32 which has received the instruction to perform a Wi-Fi Direct process causes the display unit 105 to display a QR code for Wi-Fi Direct (S1202). The QR code for Wi-Fi Direct is a QR code in which information which is necessary to set communication parameters and information for identifying a connection scheme using Wi-Fi Direct are encoded. The QR code for Wi-Fi Direct may include capability (characteristics, ability, qualification, and performance) information such as role information used in execution of a Wi-Fi Direct process. The role information used in execution of a Wi-Fi Direct process is, for example, the intent value used in a negotiation process for determining which apparatus is to act as a GO.

The camera 32 may have a configuration in which, when the communication parameter setting mode is set, whether the camera 32 is to display a QR code or the camera 32 is to photograph a QR code on another apparatus is selected through a user operation. In this example, assume that a user instructs the camera 32 to display a QR code.

The information which is necessary to set communication parameters is, for example, information used in encryption when communication parameters are communicated, and identification information of the apparatus. The information used in encryption when communication parameters are communicated may be a public key or a certificate. For example, a method disclosed in PTL 3 may be used as a method for communicating communication parameters in an encryption manner by using a public key in a communication-parameter sharing process.

The identification information of an apparatus may be a MAC address or a universally unique identifier (UUID) for identifying a device uniquely. The information which is necessary to set communication parameters may be an identifier indicating a communication-parameter sharing process. Other than this, the information may include identification information of a onetime password scheme or the like using a QR code.

When the camera 32 causes the display unit 105 to display the QR code for Wi-Fi Direct, the camera 32 starts a device searching process in Wi-Fi Direct (S1204). The device searching process is a process in the Find Phase defined in Wi-Fi Direct. In the Find Phase, a search signal to which an information component indicating that a Wi-Fi Direct process may be performed is attached is used to scan all of the channels. Then, whether or not a network is present for each channel is determined. In formation of a network for performing communication, the all-channel scan is performed to search for a channel having a small amount of interference. As the all-channel scan, active scanning and/or passive scanning defined in the IEEE 802.11 standard may be used.

When the all-channel scan is completed, the following two processes are alternately performed: a process of scanning 1ch, 6ch, and 11ch by using a search signal to search for another P2P device; and a process of receiving a search signal from a communication target through either of 1ch, 6ch and 11ch. Thus, in Wi-Fi Direct, channels used in the device searching process are limited, and channels excluding at least some among available channels are searched, whereby a reduction in the search period and improvement of search efficiency are achieved.

When the smartphone 33 receives an instruction to establish a wireless connection, from the user, the smartphone 33 enters a mode in which the photographing unit 106 is ready to capture an image. The smartphone 33 may have a configuration in which, when the communication parameter setting mode is set, whether the smartphone 33 is to display a QR code or the smartphone 33 is to photograph a QR code on another apparatus is selected through a user operation. In this example, assume that the user instructs the smartphone 33 to photograph a QR code.

When the smartphone 33 enters the mode in which a photographing operation is ready to be performed, the smartphone 33 reads the QR code displayed on the camera 32, by using the photographing unit 106 of the smartphone 33 (S1203). The smartphone 33 decodes the QR code which has been read, and obtains information indicated by the QR code. The smartphone 33 determines whether or not the information obtained from the QR code is information which is necessary to set communication parameters and whether or not the QR code includes a connection scheme request. If the QR code does not include information which is necessary to set communication parameters, the smartphone 33 may end the process with error.

When the QR code displayed by the camera 32 is a QR code for Wi-Fi Direct, the smartphone 33 starts the device searching process in Wi-Fi Direct (S1204). The smartphone 33 may transmit a search signal in which an apparatus indicated by identification information included in the QR code obtained through the photographing operation is specified, in the device searching process.

The smartphone 33 and the camera 32 perform the device searching process defined in Wi-Fi Direct, and detect each other. The smartphone 33 and the camera 32 perform the GO negotiation which is a negotiation for determining a role, GO or CL (S1205).

In the GO negotiation, the Wi-Fi Direct specification describes that the intent values are exchanged between the apparatuses, and that an apparatus having a larger value acts as a GO and an apparatus having a smaller value acts as a CL.

The apparatus which acts as a GO provides communication parameters to the other apparatus, and the apparatuses share the communication parameters (S1206). In the communication-parameter sharing process performed in S1206, a public-key encryption scheme may be used to encrypt the communication parameters and communicate the encrypted communication parameters. At that time, the encrypted communication parameters may be communicated on the basis of information included in the QR code displayed by the camera 32. The camera 32 and the smartphone 33 establish a connection by using the shared parameters (S1207).

A description will be made on a case in which the camera 32 displaying a QR code requests a connection to an access point, by using the sequence chart in FIG. 5. In FIG. 5, the smartphone 33 has established a connection with the wireless network 31 formed by the AP 34, and is performing data communication via the AP 34 (S1301). When the camera 32 enters the communication parameter setting mode, the camera 32 causes the display unit 105 to display an inquiry about whether a Wi-Fi Direct process is to be performed or an access point connection is to be established, to a user. Assume that the camera 32 receives an instruction to establish a connection with an access point, through the input unit 109 (S1302).

The camera 32 which has received an instruction to establish a connection with an access point causes the display unit 105 to display a QR code for establishing a connection with an access point (S1303). The QR code for establishing a connection with an access point is a QR code in which the above-described information which is necessary to set communication parameters and information for identifying a connection scheme using an access point connection are encoded. The information for identifying a connection scheme using an access point connection may be, for example, information indicating the infrastructure mode defined in the IEEE 802.11 standard.

When the camera 32 causes the display unit 105 to display the QR code for establishing a connection with an access point, a search process for searching for an access point transmitting the information included in the QR code is started in all channels (S1307). In this example, the camera 32 performs scanning of all channels to search for the AP 34. All channels indicate multiple available frequency bands defined in a communication scheme or the like. For example, when communication is performed in the 2.4 GHz band according to the IEEE 802.11b/g/n/ac standard, the specification describes that 1ch to 13ch are available with a width of 22 MHz per channel. In IEEE 802.11b, 14ch is available in japan. Therefore, in the case where communication is to be performed in the 2.4 GHz band according to the IEEE 802.11b/g/n/ac standard, when all of the channels are to be scanned, the camera 32 searches all of the N (N is an integer from 1 to 13 or 14) channels. The scanning may be active scanning and/or passive scanning defined in the IEEE 802.11 standard.

When the smartphone 33 receives an instruction to establish a wireless connection, from a user, the smartphone 33 enters a mode in which the photographing unit 106 is ready to capture an image. When the smartphone 33 enters the mode in which a photographing operation may be performed, the smartphone 33 reads the QR code displayed on the camera 32, by using the photographing unit 106 of the smartphone 33 (S1304).

The smartphone 33 decodes the QR code which has been read, and obtains information indicated by the QR code. The smartphone 33 determines whether or not the information obtained from the QR code is information which is necessary to set communication parameters and whether or not the QR code includes a connection scheme request.

If the QR code displayed by the camera 32 is a QR code for establishing a connection with an access point, the smartphone 33 transfers identification information of the camera 32 which is included in the QR code which has been read, to the AP 34 with which a connection has been established (S1305). The information to be transmitted is not limited to the identification information of the camera 32, and all pieces of information included in the QR code may be transmitted.

Notification of QR code information from the smartphone 33 to the AP 34 may be performed by using a secure link in a wireless LAN. Notification of identification information from the smartphone 33 to the AP 34 may be performed by using secure proximity wireless communication, such as near field communication (NFC) or Bluetooth (registered trademark).

The AP 34 to which the identification information of the camera 32 has been transferred from the smartphone 33 waits for a search signal transmitted from the camera 32 indicated by the identification information. The AP 34 having received the search signal from the camera 32 transmits a response signal including the QR code information notified from the smartphone 33. The camera 32 having received the response signal including the QR code information determines that a connection is to be established with the apparatus from which the response signal is transmitted.

The AP 34 having received the notification about the QR code information transmits a broadcast signal including information indicating that a communication-parameter sharing process has been started (S1306). The broadcast signal is periodically transmitted to broadcast the presence of the AP 34. The AP 34 may transmit the broadcast signal including the information included in the QR code. Alternatively, the AP 34 may transmit a response signal, in response to the search signal, including information indicating that a process for sharing the communication parameters has been started. The information included in the QR code and the information indicating that a process for sharing the communication parameters has been started may be the same information. That is, the information included in the QR code may indicate that a process for sharing the communication parameters has been started.

The camera 32 having detected the AP 34 transmitting the information included in the QR code and the information indicating that a process for sharing the communication parameters has been started requests the communication parameters from the AP 34. When the AP 34 receives a request for the communication parameters from the camera 32, the AP 34 transmits the communication parameters for participating in the wireless network 31, to the camera 32 (S1308). In the communication-parameter sharing process performed in S1308, a public-key encryption scheme may be used to encrypt the communication parameters and communicate the encrypted communication parameters. At that time, the encrypted communication parameters may be communicated on the basis of the information included in the QR code displayed by the camera 32. The camera 32 and the AP 34 establish a connection by using the shared parameters (S1309).

A description will be made on operations performed when the smartphone 33 performs the communication-parameter sharing process by using QR code information, according to the flowchart in FIG. 6. The flowchart in FIG. 6 is started when a setting mode for setting communication parameters is set via the input unit 109.

The flowchart illustrated in FIG. 6 indicates a process flow performed by the controller 102 reading and executing computer programs stored in the storage unit 103. Some or all of the steps illustrated in the flowchart in FIG. 6 may be implemented, for example, by using hardware such as an ASIC.

In FIG. 6, the smartphone 33 uses the photographing unit 106 to photograph a QR code for setting communication parameters (F601). The photographing operation in F601 may be performed in response to a user operation, or may be automatically performed when a QR code is detected in the angle of the field of the photographing unit 106. When the photographed QR code does not include information which is necessary to set communication parameters, the smartphone 33 may end the process with error.

The smartphone 33 determines a connection scheme included in the photographed QR code for setting communication parameters (F1401). If the connection scheme included in the QR code is a method using Wi-Fi Direct, the smartphone 33 proceeds the process to F605. In F1401, if the connection scheme included in the QR code is a method using a connection with an AP, the smartphone 33 determines whether or not the smartphone 33 is currently being connected to an access point (F1402).

In F1402, if the smartphone 33 is currently not being connected to an access point, the smartphone 33 establishes a connection with an access point which is registered in advance and with which a connection may be established (F1403). In F1403, if no access points which are registered in advance are present or if a connection fails to be established because no access points are detected, the smartphone 33 may end the process with error. Alternatively, in F1402, if the smartphone 33 is currently not being connected to an access point, the smartphone 33 may end the process with error. If the smartphone 33 determines that the smartphone 33 is currently being connected to an access point in F1402 or if a connection has been established with an access point in F1403, the process proceeds to F610.

If the connection method included in the QR code is Wi-Fi Direct, the smartphone 33 determines whether or not a connection process using Wi-Fi Direct is to be performed (F605). For example, when the smartphone 33 does not support Wi-Fi Direct, the smartphone 33 ends the process.

If the smartphone 33 determines that a connection process using Direct is to be performed, the smartphone 33 starts the connection process using Wi-Fi Direct. When the smartphone 33 starts the connection process using Wi-Fi Direct, the smartphone 33 performs the above-described device searching process (F606). When an apparatus indicated by the information included in the QR code is detected in the device searching process, the smartphone 33 performs the role determining process using the GO negotiation defined in Wi-Fi Direct (F607).

When roles are determined by using the GO negotiation, the smartphone 33 performs the communication-parameter sharing process with an apparatus indicated by the information included in the QR code (F608). In F607, when the smartphone 33 determines that the smartphone 33 is to act as a GO, the smartphone 33 provides communication parameters for the wireless network formed by the smartphone 33, to the apparatus indicated by the information included in the QR code. In F607, when the smartphone 33 determines that the smartphone 33 is to act as a CL, the smartphone 33 receives communication parameters for the wireless network formed by the apparatus indicated by the information included in the QR code, from the apparatus.

The smartphone 33 uses the communication parameters shared in the communication-parameter sharing process, to establish a connection with the apparatus indicated by the information included in the QR code (F609), and ends the process.

If the smartphone 33 determines that the smartphone 33 is being connected to an access point in F1402, the smartphone 33 transmits information about the apparatus included in the QR code, as information about an apparatus requesting the communication parameters, to the access point to which the smartphone 33 is being currently connected (F610). In this case, the access point and the apparatus indicated by the information included in the QR code perform the communication-parameter sharing process, and establish a wireless connection. The smartphone 33 causes the access point to start a process for sharing the communication parameters, by notifying the access point of information about the apparatus requesting communication parameters in F610.

A description will be made on operations performed when the camera 32 uses information about a QR code to perform a communication-parameter sharing process, according to the flowchart illustrated in FIG. 7. The flowchart in FIG. 7 is started when the setting mode for setting communication parameters is set via the input unit 109.

The flowchart in FIG. 7 indicates a process flow performed by the controller 102 reading and executing computer programs stored in the storage unit 103. Some or all of the steps illustrated in the flowchart in FIG. 7 may be implemented, for example, by using hardware such as an ASIC.

In FIG. 7, the camera 32 causes the display unit 105 to display a QR code in which information which is necessary to set communication parameters is encoded (F701). If the connection scheme included in the QR code displayed in F701 is a method using Wi-Fi Direct, the camera 32 proceeds the process to F704. If the connection method included in the QR code is a method using a connection to an AP, the camera 32 proceeds the process to F710 (F1501).

If a connection using Wi-Fi Direct is requested, the camera 32 performs the connection process using Wi-Fi Direct. First, the camera 32 performs a device searching process in Wi-Fi Direct (F704). When a communication target fails to be detected in a predetermined period in the device searching process in Wi-Fi Direct, the process may end with error. The camera 32 performs a Wi-Fi Direct process in the device searching process in Wi-Fi Direct. If the camera 32 detects a communication target transmitting information indicating that the QR code has been photographed, the camera 32 performs the GO negotiation defined in Wi-Fi Direct (F705). The camera 32 performs the communication-parameter sharing process with the communication target in accordance with roles determined in the GO negotiation defined in Wi-Fi Direct (F706). In the communication-parameter sharing process performed in F706, communication parameters encrypted on the basis of information about the displayed QR code may be communicated. The camera 32 establishes a wireless connection with the communication target by using the shared communication parameters (F707), and ends the process.

If a connection to an access point is requested, the camera 32 performs a search process of searching for an access point transmitting a signal including information about the QR code and information indicating that a process for sharing communication parameters has been started (F710). The search process in F710 is performed in all of the channels. When an access point which transmits a signal including information about the QR code fails to be detected in a predetermined period in the search process in F710, the process may end with error.

If an access point which transmits a signal including information about the QR code is detected, the camera 32 performs the process in F706 in which communication parameters are received from the access point. The camera 32 establishes a wireless connection with the access point by using the communication parameters, and ends the process.

As described above, when photographing of an image triggers sharing of communication parameters which is followed by establishment of a connection between apparatuses using either of multiple connection schemes, an apparatus displaying a QR code notifies an apparatus photographing the QR code of the connection scheme. Therefore, the apparatus photographing the QR code may start a process according to the connection scheme that is to be performed. Accordingly, reduction is achieved in occurrence of a case in which a connection scheme performed by the apparatus displaying the QR code is different from that performed by the target apparatus with which a connection is to be established, and in which a correct connection fails to be established.

According to the present embodiment, when a connection using Wi-Fi Direct or a connection to an access point for which all of the channels need to be searched is selectively performed by using information about a photographed image, reduction is achieved in occurrence of a case in which the type of a process performed by one apparatus is different from that performed by the other apparatus. In addition, since an apparatus displaying an image and an apparatus photographing the image share a connection scheme, switching may be performed between searching of 1ch, 6ch, and 11ch and scanning of all channels, resulting in reduction in occurrence of a case in which establishing of a connection takes time and a case in which a correct connection fails to be established. Consequently, according to the present embodiment, when information about a photographed image is used to perform multiple communication-parameter sharing processes for which search methods are different from each other, a wireless connection may be established with a communication target by using a desired connection scheme.

Modified Embodiments

In the above-described embodiment, the configuration in which the image of a QR code is used to transmit information for setting communication parameters, between apparatuses is described. However, instead of photographing of a QR code, wireless communication, such as NFC or Bluetooth (registered trademark), may be used. Instead, wireless communication, such as IEEE 802.11ad or TransferJet (trademark), may be used.

A QR code which is read may be a QR code attached on an instruction manual or a package such as corrugated cardboard used when the communication apparatus is sold. Alternatively, instead of a QR code, a one-dimensional bar code or a two-dimensional code other than a QR code may be used. Instead of machine-readable information such as a QR code, information which may be read by a user may be used.

In the embodiments, the case in which communication between apparatuses is performed through wireless LAN communication based on IEEE 802.11 is described. However, this is not limiting. For example, a wireless communication medium, such as Wireless USB, MBOA, Bluetooth (registered trademark), ultra-wideband (UWB), ZigBee, or NFC, may be used to perform communication. MBOA stands for the Multi Band Orthogonal Frequency Division Multiplexing (OFDM) Alliance. Ultra-wideband (UWB) includes Wireless USB, Wireless 1394, and WINET.

The present invention may be achieved by performing a process in which a program for achieving one or more functions according to the above-described embodiments is supplied to a system or apparatus over a network or via a storage medium and in which one or more processors in a computer in the system or apparatus read and execute the program. The present invention may be achieved by using a circuit (such as an ASIC) achieving one or more functions.

According to the above-described embodiments, when photographing of an image triggers sharing of communication parameters, the image displaying side and the image photographing side may share process information, and a wireless connection may be established by using a desired connection scheme.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-093543, filed Apr. 30, 2015, which is hereby incorporated by reference herein in its entirety.

The invention claimed is:

1. A first communication apparatus comprising:
one or more processors; and
one or more memories storing instructions that, when executed by the one or more processors, cause the apparatus to:
select a scheme from between (i) a first scheme which establishes a wireless connection with an access point and (ii) a second scheme which establishes a wireless connection to perform direct communication with a second communication apparatus, wherein the second communication apparatus has acquired an image displayed on a display by the first communication apparatus;
perform control to cause the display to display the image, the image including first information which is necessary for sharing a communication parameter for establishing a wireless connection and second information which includes information that indicates the selected scheme;
establish, in a case where the second information indicates the first scheme, a wireless connection with the access point, based on a communication parameter which is shared by using the first information; and
establish, in a case where the second information indicates the second scheme, a wireless connection with the second communication apparatus, based on a communication parameter shared with the second communication apparatus by using the first information.

2. The first communication apparatus according to claim 1, wherein the execution of the instructions further causes the first communication apparatus to:

in a case where the second information indicates the first scheme, search for and detect the access point,
wherein the first communication apparatus establishes the wireless connection with the detected access point.

3. The first communication apparatus according to claim 2, wherein the first communication apparatus searches for the access point by transmitting a signal including the first information.

4. The first communication apparatus according to claim 2, wherein the execution of the instructions further causes the first communication apparatus to:

in a case where the second information indicates the second scheme, search for and detect the second communication apparatus,
wherein the first communication apparatus establishes a wireless connection with the detected second communication apparatus.

5. The first communication apparatus according to claim 4, wherein the first communication apparatus searches for the second communication apparatus in 1 ch, 6ch, and 11ch by using a signal with information that indicates that the second scheme is available.

6. The first communication apparatus according to claim 1, wherein the first communication apparatus performs control to display a one-dimensional code or a two-dimensional code as the image which includes the first information and the second information.

7. The first communication apparatus according to claim 1, wherein the first communication apparatus performs controls to display a QR code as the image which includes the first information and the second information.

8. The first communication apparatus according to claim 1, wherein the second scheme is a scheme for establishing a wireless connection by Wi-Fi Direct.

9. The first communication apparatus according to claim 1, wherein the communication parameter, which is shared by using the first information, includes at least one of an SSID, an encryption key, an encryption scheme, an authentication key, or an authentication scheme.

10. The communication apparatus according to claim 1, wherein the first scheme is a scheme for establishing a wireless connection compliant with an IEEE 802.11 standard.

11. The first communication apparatus according to claim 1, wherein, in a case where the first communication apparatus establishes a wireless connection with the second communication apparatus, the first communication apparatus performs a negotiation with the second communication apparatus to determine which communication apparatus will provide a communication parameter and which will be provided a communication parameter, and according to the result of the negotiation, the first communication apparatus provides a communication parameter encrypted by the first information to the second communication apparatus or receives a communication parameter encrypted by the first information from the second communication apparatus, and establishes a wireless connection with the second communication apparatus based on the communication parameter provided by the first communication apparatus or received from the second communication apparatus.

12. The first communication apparatus according to claim 1, wherein the first information is a public key which is to be used for sharing a communication parameter.

13. The first communication apparatus according to claim 1, wherein the execution of the instructions further causes the first communication apparatus to:

accept a user instruction to select one of the first scheme or the second scheme,
wherein, the selection of the first scheme or the second scheme is performed on the basis of the accepted user instruction.

14. The first communication apparatus according to claim 1, wherein in a case where the first communication apparatus shares a communication parameter with the second communication apparatus, the first communication apparatus and the second communication apparatus determine which communication apparatus is to act as a group owner compliant with a Wi-Fi Direct standard and which communication apparatus is to act as a client compliant with the Wi-Fi Direct standard,
wherein the group owner is to provide a communication parameter and the client is to be provided a communication parameter.

15. A first communication apparatus comprising:

one or more processors; and one or more memories storing instructions that, when executed by the one or more processors, cause the first communication apparatus to:

acquire first information used to share a communication parameter for establishing a wireless connection with an access point and second information that indicates a scheme for establishing a wireless connection, the first information and the second information included in an image displayed by a second communication apparatus;

determine whether the acquired second information indicates a first scheme which establishes a wireless connection with an access point or a second scheme which establishes a wireless connection for performing direct communication with the second communication apparatus;

establish, in a case where it is determined that the acquired second information indicates the first scheme, a wireless connection with the access point; and establish, in a case where it is determined that the acquired second information indicates the second scheme, a wireless connection with the second communication apparatus on the basis of the communication parameter shared with the second communication apparatus by using the first information.

16. The first communication apparatus according to claim 15, wherein the execution of the instructions further causes the first communication apparatus to:
photograph the image,
wherein the first communication apparatus acquires the first information or the second information from a one-dimensional code or a two-dimensional code contained in the image photographed by the first communication apparatus.

17. The first communication apparatus according to claim 15,
wherein the first communication apparatus searches for the second communication apparatus in 1 ch, 6ch, and 11ch by using a signal with information that indicates that the second scheme is available.

18. The first communication apparatus according to claim 15,
wherein the second scheme is a scheme for establishing a wireless connection by Wi-Fi Direct.

19. The first communication apparatus according to claim 15, wherein the first information is a public key which is to be used for sharing a communication parameter.

20. The first communication apparatus according to claim 15, wherein the execution of the instructions further causes the first communication apparatus to:
transmit, in a case where it is determined that the acquired second information indicates the first scheme, the first information to the access point with which the first communication apparatus established a wireless connection.

21. The first communication apparatus according to claim 15, wherein the access point with which the first communication apparatus establishes a wireless connection in a case where it is determined that the acquired second information indicates the first scheme, is an access point that has been registered in advance with the communication apparatus.

22. The first communication apparatus according to claim 15, wherein the execution of the instructions further causes the first communication apparatus to:
search for and detect, in a case where it is determined that the second information indicates the second scheme, the second communication apparatus,
wherein the first communication apparatus establishes a wireless connection with the detected second communication apparatus.

23. The first communication apparatus according to claim 15, wherein
in a case where the first communication apparatus shares a communication parameter with the second communication apparatus, the first communication apparatus and the second communication apparatus determine which communication apparatus is to act as a group owner compliant with a Wi-Fi Direct standard and which is to act as a client compliant with the Wi-Fi Direct standard,
wherein the group owner is to provide a communication parameter and the client is to be provided a communication parameter.

24. The first communication apparatus according to claim 15, wherein the communication parameter, which is shared by using the first information, includes at least one of an SSID, an encryption key, an encryption scheme, an authentication key, or an authentication scheme.

25. The first communication apparatus according to claim 15, wherein the first scheme is a scheme for establishing a wireless connection compliant with an IEEE 802.11 standard.

26. The first communication apparatus according to claim 15, wherein, in a case where the first communication apparatus establishes a wireless connection with the second communication apparatus, the first communication apparatus performs a negotiation with the second communication apparatus to determine which communication apparatus will provide a communication parameter and which will be provided a communication parameter, and according to the result of the negotiation, the first communication apparatus provides a communication parameter encrypted by the first information to the second communication apparatus or receives a communication parameter encrypted by the first information from the second communication apparatus, and establishes a wireless connection with the second communication apparatus based on the first communication parameter provided by the communication apparatus or received from the second communication apparatus.

27. A method for controlling a first communication apparatus, comprising:
selecting a scheme from between (i) a first scheme which establishes a wireless connection with an access point and (ii) a second scheme which establishes a wireless connection to perform direct communication with a second communication apparatus, wherein the second communication apparatus has acquired an image displayed on a display by the first communication apparatus;
performing control to cause the display unit to display the image, the image including first information which is necessary for sharing a communication parameter for establishing a wireless connection, and second information which includes information that indicates the selected scheme;
establishing, in a case where the second information indicates the first scheme, a wireless connection with the access point, based on a communication parameter which is shared by using the first information; and
establishing, in a case where the second information indicates the second scheme, a wireless connection with the second communication apparatus, based on a communication parameter shared with the second communication apparatus by using the first information.

28. A method for controlling a first communication apparatus, comprising:
acquiring first information used to share a communication parameter for establishing a wireless connection with an access point and second information that indicates a scheme for establishing a wireless connection, the first information and the second information included in an image displayed by a second communication apparatus;
determining whether the acquired second information indicates a first scheme which establishes a wireless connection with an access point or a second scheme which establishes a wireless connection for performing direct communication with the second communication apparatus;
establishing, in a case where it is determined that the acquired second information indicates the first scheme, a wireless connection with the access point; and
establishing, in a case where it is determined that the acquired second information indicates the second scheme, a wireless connection with the second communication apparatus on the basis of the communication parameter shared with the second communication apparatus by using the first information.

29. A computer-readable storage medium storing computer executable instructions which, when executed, cause a first communication apparatus to execute the following steps:

selecting a scheme from between (i) a first scheme which establishes a wireless connection with an access point and (ii) a second scheme which establishes a wireless connection to perform direct communication with a second communication apparatus, wherein the second communication apparatus has acquired an image displayed on a display by the first communication apparatus;

performing control to cause the display to display the image, the image including first information which is necessary for sharing a communication parameter for establishing a wireless connection, and second information which includes information that indicates the selected scheme;

establishing, in a case where the second information indicates the first scheme, a wireless connection with the access point, based on a communication parameter which is shared by using the first information; and establishing, in a case where the second information indicates the second scheme, a wireless connection with the second communication apparatus, based on a communication parameter shared with the second communication apparatus by using the first information.

30. A computer-readable storage medium storing computer executable instructions which, when executed, cause a first communication apparatus to execute the following steps:

acquiring first information used to share a communication parameter for establishing a wireless connection with an access point and second information that indicates a scheme for establishing a wireless connection, the first information and the second information included in an image displayed by a second communication apparatus;

determining whether the acquired second information indicates a first scheme which establishes a wireless connection with an access point or a second scheme which establishes a wireless connection for performing direct communication with the second communication apparatus;

establishing, in a case where it is determined that the acquired second information indicates the first scheme, a wireless connection with the access point; and establishing, in a case where it is determined that the acquired second information indicates the second scheme, a wireless connection with the second communication apparatus on the basis of the communication parameter shared with the second communication apparatus by using the first information.

\* \* \* \* \*